(12) United States Patent
Sly et al.

(10) Patent No.: US 11,840,339 B2
(45) Date of Patent: Dec. 12, 2023

(54) METHOD, DEVICE, AND SYSTEM FOR AVALANCHE CONTROL

(71) Applicant: 612431 B.C. LTD., Victoria (CA)

(72) Inventors: Adam Sly, Victoria (CA); David Sly, Victoria (CA)

(73) Assignee: 612431 B.C. LTD., Victoria (CA)

( * ) Notice: Subject to any disclaimer, the term of this patent is extended or adjusted under 35 U.S.C. 154(b) by 0 days.

(21) Appl. No.: 17/683,098

(22) Filed: Feb. 28, 2022

(65) Prior Publication Data

US 2022/0274705 A1 Sep. 1, 2022

(30) Foreign Application Priority Data

Feb. 26, 2021 (CA) .................. CA 3110543

(51) Int. Cl.

| | | |
|---|---|---|
| *F42B 12/20* | (2006.01) | |
| *B64D 1/04* | (2006.01) | |
| *B64D 1/06* | (2006.01) | |
| *F42D 1/04* | (2006.01) | |
| *F42D 3/00* | (2006.01) | |
| *B64C 39/02* | (2023.01) | |
| *F42C 13/00* | (2006.01) | |
| *G08C 17/02* | (2006.01) | |

(52) U.S. Cl.
CPC .............. *B64D 1/04* (2013.01); *B64C 39/024* (2013.01); *B64D 1/06* (2013.01); *F42B 12/202* (2013.01); *F42C 13/00* (2013.01); *F42D 1/04* (2013.01); *F42D 3/00* (2013.01); *B64U 2201/20* (2023.01); *G08C 17/02* (2013.01)

(58) Field of Classification Search
CPC .... B64D 1/04; B64D 1/06; F42D 1/00; F42D 1/04; F42D 3/00; F42D 3/06; B64C 39/02; B64C 39/024; F42C 13/00; B64U 2101/15; B64U 2101/18; B64U 2201/20; F42B 12/20; F42B 12/201; F42B 12/202; F41A 19/08
USPC .................. 89/1.15–1.61; 102/301, 302, 314
See application file for complete search history.

(56) References Cited

U.S. PATENT DOCUMENTS

2022/0212791 A1 * 7/2022 Knab ..................... F42D 1/045

FOREIGN PATENT DOCUMENTS

| EP | 3489138 A1 * | 5/2019 | .............. F41A 19/08 |
|---|---|---|---|
| FR | 2964732 A1 * | 3/2012 | ............. F42C 13/023 |
| JP | H0611300 A * | 1/1994 | .............. F42D 3/00 |
| RU | 2471141 C1 * | 12/2012 | .............. F42D 3/00 |

OTHER PUBLICATIONS

Machine translation of EP-3489138-A1 (Year: 2019).*
Machine translation of RU-2471141-C1 (Year: 2012).*
Machine translation of FR-2964732-A1 (Year: 2012).*
Machine translation of JP-H0611300-A (Year: 1994).*

* cited by examiner

*Primary Examiner* — James S Bergin (57) ABSTRACT

A method, a device, and a system using the device, for avalanche control using an unmanned aerial vehicle to transport an explosive charge to a snow surface or snowpack. A holder of the device holds the explosive charge in a container. A receiver of the device receives a release signal. The holder releases the explosive charge in response to the release signal. A coupler couples the holder to the unmanned aerial vehicle. The explosive charge is fuzed to detonate after release from the holder to trigger an avalanche.

16 Claims, 11 Drawing Sheets

METHOD, DEVICE, AND SYSTEM FOR AVALANCHE CONTROL

CROSS-REFERENCE TO RELATED APPLICATIONS

This application claims the benefit of Canadian Patent Application No. 3,110,543, filed on Feb. 26, 2021.

The aforementioned application is incorporated by reference herein in its entirety and is hereby expressly made a part of this specification.

TECHNICAL FIELD

The present invention relates to the field of snow avalanche safety, namely the delivery of explosives for the controlled triggering of avalanches.

BACKGROUND

Avalanche control or avalanche defense activities reduce the hazard avalanches pose to human life, activity, and property. Avalanche control begins with a risk assessment. This is conducted by identifying geographic features such as vegetation patterns, drainages, and seasonal snow distribution that are indicative of avalanches. From the identified avalanche risks, the hazard is assessed by identifying threatened critical infrastructure such as roads, ski-hills, and buildings. Avalanche control programs address the avalanche hazard by formulating prevention and mitigation plans, which are then executed during the snow season.

Active techniques reduce the risk of an avalanche occurring by facilitating the stabilization and settlement of the snowpack through three forms of intervention: (a) disrupting weak layers in the snowpack, (b) increasing the uniformity of the snowpack, and (c) lessening the amount of snow available in snowpack for entrainment in an avalanche.

This can be accomplished either by triggering smaller less hazardous avalanches, or by directly influencing the structure of the layering of the snowpack.

Active avalanche control can be broadly classified into either mechanical or explosive methods. Mechanical methods are typically used in either remote terrain, smaller terrain, or less hazardous terrain; while explosive methods are used in accessible large high hazard terrain, or terrain with industrial, commercial, recreational, urbanized, and transportation usage.

Explosive techniques involve the artificial triggering of smaller less destructive avalanches, by detonating charges either above or on the snow surface. The explosives may be deployed by manually hand tossing and/or lowering, by dropping from a helicopter, or by shelling using gas or pyrotechnic propelled munitions. In balancing the hazard to personnel with the effectiveness of the deployment method at accessing and triggering avalanche terrain, each method has its drawbacks and advantages. Weather and terrain are also factors for consideration.

Explosive control has proved to be effective in areas with easy access to avalanche start zones and where minor avalanches can be tolerated. It is mostly unacceptable, however, in areas with human residence and where there is even a small probability of a larger avalanche.

SUMMARY

In various aspects, the disclosure describes a method, a device, and a system using the device, for avalanche control using an unmanned aerial vehicle to transport an explosive charge to a snow surface or snowpack. A holder of the device may hold the explosive charge in a container. A receiver of the device may receive a release signal. The holder may release the explosive charge in response to the release signal. A coupler may couple the holder to the unmanned aerial vehicle. The explosive charge may be fuzed and ready to detonate after release from the holder to trigger an avalanche.

In some aspects, the disclosure describes an avalanche control system that may be adapted for delivering and igniting an explosive payload. The system may include a drone and a barrel assembly (the device or part thereof) attached to the drone, for releasably supporting an explosive payload. A control unit of the system includes means for instructing the barrel assembly to release the explosive payload, such as for sequential transmission of a first radio signal on a first channel and a second radio signal on a second channel; and means for initiating the delayed ignition of the explosive payload, once the explosive payload has cleared the barrel. The barrel assembly may comprise two actuators each having a closed position in which in use the actuator supports the explosive payload and an open position in which the actuator does not support the explosive payload. The first radio signal may cause one of the actuators to change from the closed to the open position and the second radio signal causes the other of the actuators to change from the closed to the open position. The barrel assembly may comprise a rectangular barrel; and the explosive payload may comprise a cardboard box sized for sliding within the rectangular barrel, and containing explosive material. In use, two fuses are positioned with each having a distal end within the explosive payload and a proximal end extending from the explosive payload; and the means for initiating the delayed ignition of the explosive payload comprises two pull wire lighters, each connected between the barrel assembly and the proximal end of a respective fuse.

In an aspect, the disclosure describes a device for avalanche control. The device also includes a receiver configured to receive a release signal; a holder configured to hold an explosive charge and coupled to the receiver to release the explosive charge in response to the receiver receiving the release signal; and a coupler coupled to the holder and configured to attach the holder to an unmanned aerial vehicle to transport the explosive charge to above a snow surface using the unmanned aerial vehicle, the explosive charge being fuzed to detonate after release from the holder to trigger an avalanche.

In an aspect, the disclosure describes a system for avalanche control of a snowpack. The system also includes an unmanned aerial vehicle configured to navigate to the snowpack; a holder attached to the unmanned aerial vehicle, the holder including a door at least partially defining a holding volume, the door being actuatable to move from a closed position to an open position; a container disposed in the holding volume and containing an explosive charge, the container being supported by the door in the closed position and being releasable away from the unmanned aerial vehicle above the snowpack by actuation of the door to the open position when the unmanned aerial vehicle is above the snowpack; and a line attached to the unmanned aerial vehicle and operably coupled to a fuze of the explosive charge, the fuze being configured to detonate the explosive charge at a predetermined distance away from the unmanned aerial vehicle to trigger an avalanche of the snowpack by pulling of the line relative to the fuze as the container falls above the snowpack.

In an aspect, the disclosure describes a method of avalanche control. The method of avalanche control also includes transporting an explosive charge to above a snow surface using an unmanned aerial vehicle; releasing the explosive charge above the snow surface by allowing the explosive charge to fall away from the unmanned aerial vehicle, and causing detonation of the explosive charge above the snow surface at a predetermined distance away from the unmanned aerial vehicle.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

Embodiments of the Present Invention are at Times Referred to as Drone Explosives Delivery Systems (DEDS)

As indicated in the drawings, DEDS may include an explosive delivery system comprising a flying drone with remote-control components; a barrel assembly (at times referred to as a DEDS barrel); a payload; a control unit transmitter and receiver. Additionally various flight assist accessories, such as monitors and cameras, may be provided.

An avalanche control system for delivering and igniting an explosive payload, in accordance with some embodiments, may comprise a drone with a GPS locator on board, a front facing digital camera or other imaging device, a down facing target locating digital camera or other imaging device.

In some embodiments, the barrel assembly may be attached to the drone via quick connect fittings for releasably supporting an explosive payload of 2-6 kgs. In some embodiments, a custom designed cardboard box may be configured to house explosives for an appropriately sized payload.

In some embodiments, the control unit may include means for instructing the barrel assembly to release the explosive payload. In various embodiments, these may include means for sequential transmission of a radio signal to a first and second receiving channel.

In various embodiments, a means for initiating the delayed ignition of the explosive payload once gravity has forced the explosive payload to clear the drone may be provided.

In various embodiments, redundant components from start to finish of the delivery process may be used to ensure full functionality on every mission.

In some embodiments, the barrel assembly may comprise two actuators. These actuators may hold the explosive payload in place when (actuators and/or doors are) closed and may jettison the payload when opened, by means of gravity energy. The first radio signal may cause one of the actuators to change from the closed to the open position and the second radio signal may cause the other of the actuator to change from the closed to the open position. In various embodiments, the control signal may function at a minimum of 3 kms, line of sight transmission.

In various embodiments, the barrel assembly may comprise a rectangular barrel. In some embodiments, the explosive payload may comprise a cardboard box sized for sliding within the rectangular barrel and containing explosive material, and a RECCO™ reflector tab, for use in locating an un-exploded charge. In various embodiments, the box may have "dangerous goods" markings, be stacked and burst tested and be double walled, and built to industry regulation specifications.

In various embodiments, during or in use, two fuses may be positioned with each having a detonator end within the explosive payload and the initiating end (which may be square cut) extending from the explosive payload. The initiating end may be the end where detonation and/or ignition is initiated. In some embodiments, the means for initiating the delayed ignition of the explosive payload may comprise two pull wire lighters, each connected between the barrel assembly and the initiating end of a respective fuse. In various embodiments, such features may enable initiation of the payload only when it has fallen below and completely clear of the barrel.

In some embodiments, the length (e.g. a minimum of 550 mm) may advantageously delay feature from the fuses into the explosive's charges of approximately 30 seconds. In some cases, altitude may change the delay time burn. For example, where higher altitudes may have lower barometric pressure, fuses may burn slightly slower as altitude is gained.

In various embodiments, during or in use, the barrel assembly may fit underneath the drone and within the drone landing gear legs. In various embodiments, the barrel (or holder or device) may be made of ABS plastic which may be non-sparking and may not impede the transmission signals between control units. In some embodiments, the barrel may be shaped as a rectangular cube.

In some embodiments, an exemplary rectangular barrel (or holder) may be about 254 mm by 254 mm by 355 mm. In various embodiments, the barrel may have a lid on it to fit over top of the square (defined by a cross-section of the rectangular barrel) and may be locked down on two sides. In various embodiments, the lid may be made of ABS plastic.

In some embodiments, attached to the lid may be the male quick connect fitting (or coupler), the female quick connect fitting being attached to the drone. A suitable quick connector may be a FREEFLY™ "Toad In The Hole" Quick Release BH #FR91000027 MFR #910-00027, which may be described as a lightweight, low-profile design; primary clamp and secondary safety catch release mechanism; 6061-T6 CNC-machined aluminum; titanium-Nitride-coated catch-release for durability; and being able to be mounted in any orientation (0-360°)". For example, the lid may be rotatable about the lid via the quick connect fitting.

In various embodiments, the door may be a trap door floor. In some embodiments, the trap door may be made of ABS plastic. In various embodiments, the trap door may be attached to the barrel body by two hinges and may be maintained in a closed position (in which the trap door supports the payload within the barrel) by means of two pins within two actuators, e.g. custom actuators.

In various embodiments, for redundancy, the system may use 2 Pull Wire Lighters (PWLs) to light the fuse assemblies. In various embodiments, it is understood that commercially available PWLs (3 of which are known to the inventors) may be suitable for use with this system.

In various embodiments, safety fuse assemblies may be provided. In some embodiments, at least one of two types of premade fuse assemblies with static shunts installed may be used: Cobra™ Safety Fuse Assemblies and Mildet™ Safety Fuse Assemblies. In some cases, depending on jurisdictional regulations, custom shunted fuse assemblies may also be used in this system.

In various embodiments, the device may include retaining hooks, such as pull wire lighter (PWL) retaining hooks. In some embodiments, these may be located on an upper inside of the barrel, in diagonal corners, not attached to the lid. In various embodiments, a carabiner, connected inside the PWL retaining hook(s) may used to lock the PWL string into the arming position.

In various embodiments, the device may be provided with two functioning actuators. In some embodiments, these pins and actuators may support the trap door are positioned at approximately the 63 mm and 189 mm marks along the bottom of the front side of the barrel body. In various embodiments, such actuators may be capable of functioning with up to 10 kg payload on top of a trapdoor and may be of the geometry indicated by drawings.

In various embodiments, radio communication lines may be maintained via a 12-volt AHR battery-powered, 2-channel digital receiver, and antenna that are positioned on the side of the barrel with the wires extending through the two channels, through the relays, and then to the actuators.

In various embodiments, electrical components of the barrel receiver assembly may include: a digital 26.995 MHz 2 Channel Receiver, a 12-volt battery pack with 1-amp capacity (AHR), with on off switch, a 120—12-volt automatic charger, a 27 MHz rubber duck style antenna, two 12-volt single pole, single through relays, two 12-volt custom actuators, two on/off toggle switches (one for the battery and one for the receiver mounted on the front of the outside of the DEDS), and miscellaneous wires and connectors.

In various embodiments, the barrel may be equipped with a front facing, waterproof, translucent Lexan™ cover to protect all electrical components from weathering. This may fit underneath and seal with the lid. In various embodiments, translucent Lexan™ may be used to allow the operator to see the power and transmission lights to confirm the system is online and ready for use.

In some embodiments, devices may be configured for a maximum of 6 kg payloads, and a minimum of 2 kgs payloads. In various embodiments, larger payloads may be available by using a drone with a larger gross vehicle weight. In some embodiments, a (payload) container for use with the embodiment barrel may be a custom certified transportation of dangerous goods cardboard box, with appropriate decals, both in French and English information labels for use within Canada, and, with a burst rating of about 275 kg.

In various embodiments, a plastic liner may be used inside such a (payload container) box to help contain the explosives. In some embodiments, plastics zip tie(s) may used to close and seal the plastic liner. In various embodiments, the payload box may be filled with a maximum of 6 kg payload, minimum of 2 kg payload, in accordance with a desired effect. In various embodiments, the top four flaps of the box may be perforated with an "X," to form an opening of the box such that fuse assemblies may be run through the "X" perforations. In some embodiments, the box may be secured and closed with low temperature packing tape. In some embodiments, the container may be equipped with a Recco™ reflector chip mounted inside the box for helping locate the container if lost. A Recco™ reflector chip may be a passive transponder configured to reflect and/or retransmit a received radio signal (possibly, after modification the radio signal).

In various embodiments, payload explosives used with this system may be made of cap sensitive emulsion, NG (nitroglycerine) dynamites, ANFO or AN/FO (ammonium nitrate/fuel oil), Pentolite TNT, Composition B TNT and/or a combination of all of these. In some embodiments, 3-hole Pentolite or Composition B TNT booster, combined with appropriate amounts of ANFO needed for a particular target, may be used to achieve improved ergonomics, explosives shelf life, simplicity, construction grade commercial explosives availability, and/or economics. In some cases, for safety and results, the system may be operated by a blaster (a user) and a pilot licensed in the applicable jurisdiction.

In various embodiments, a transmitter control unit may include a digital 26.995 MHz 2 Channel transmitter, a small case ("pelican case"), a 12-volt battery pack with AHR capacity, a 120-12-volt automatic AC charger, a fuse and fuse holder for main power, on/off toggle switches, a safety switch with audible alarm, a momentary toggle fire switch, a 27 MHz high gain magnetic mount antenna including coax and BNC connector, and miscellaneous wires and connectors.

In various embodiments, a transmitter control unit may be configured to transmit on two different channels, one at a time. The barrel assembly (holder), receiver, and/or device may be configured to receive the two different channels. In some embodiments, the transmitter may be configured so that one channel may be used to initiate one of the trap door actuators and the other channel may be used to initiate the other trap door actuator. In this way, in some embodiments, two unique, distinct, and digital transmissions from the control unit may be required to open the trap door and to drop the payload, which is introduces increases redundancy in the system and improvements in the system.

In various embodiments, confirmation of payload deployment and ignition may be achieved by blaster and pilot visuals and audible detonation; dramatic, sudden, and/or immediate reduction in the drone hovering RPM when the payload is jettisoned, down facing camera visual, and/or evidence of the trap door floor swinging open, e.g. a sensor positioned to determine swinging open of a door.

In various embodiments, equipment for loading may include explosives, safety-fuse assemblies, a drone, a DEDS barrel, and/or additional equipment.

Explosives may include two 6 kg ANFO and a Twinplex™ TNT booster. Safety-fuse assemblies may include two units, 0.5 m shunted safety fuse assemblies and two PWLs. A drone may have the following features: Payload working capacity of 16 kgs (or more), appropriately sized landing gear with quick connector, front and down facing cameras, and 32 satellite capable GPS locator. A DEDS barrel may include or be associated with a pelican case with transmitter radio controller and trigger mounted inside, a signal 2 channel receiver, with battery, relays and actuators, a 6 kg ABS payload container, a 2-6 kg cardboard payload box, two Carabiners, and blasting tools to cut fuses and attach PWLs, low temperature electric tape, and low temperature packing tape. In various embodiments, additional equipment may include container for safety fuse assemblies, container for PWLs, a container for explosives, and room temperature container for extra drone batteries.

In various embodiments, a licensed blaster may have primary responsibility for the following: safety of the entire operation, supervision of the assembly and disassembly of the charges, pre-loading function and communication tests, detonation of the charge.

In various embodiments, the licensed pilot may be responsible for the following: assisting in the assembly and disassembly of charges, flying the drone to and from the launch site to the target(s), testing of the drone functions and communication prior to loading, ensuring pre-trip functionality of all drone systems, and/or programming the drone with trip details (if applicable).

Aspects of various embodiments are now described in relation to the figures.

Figure 1:
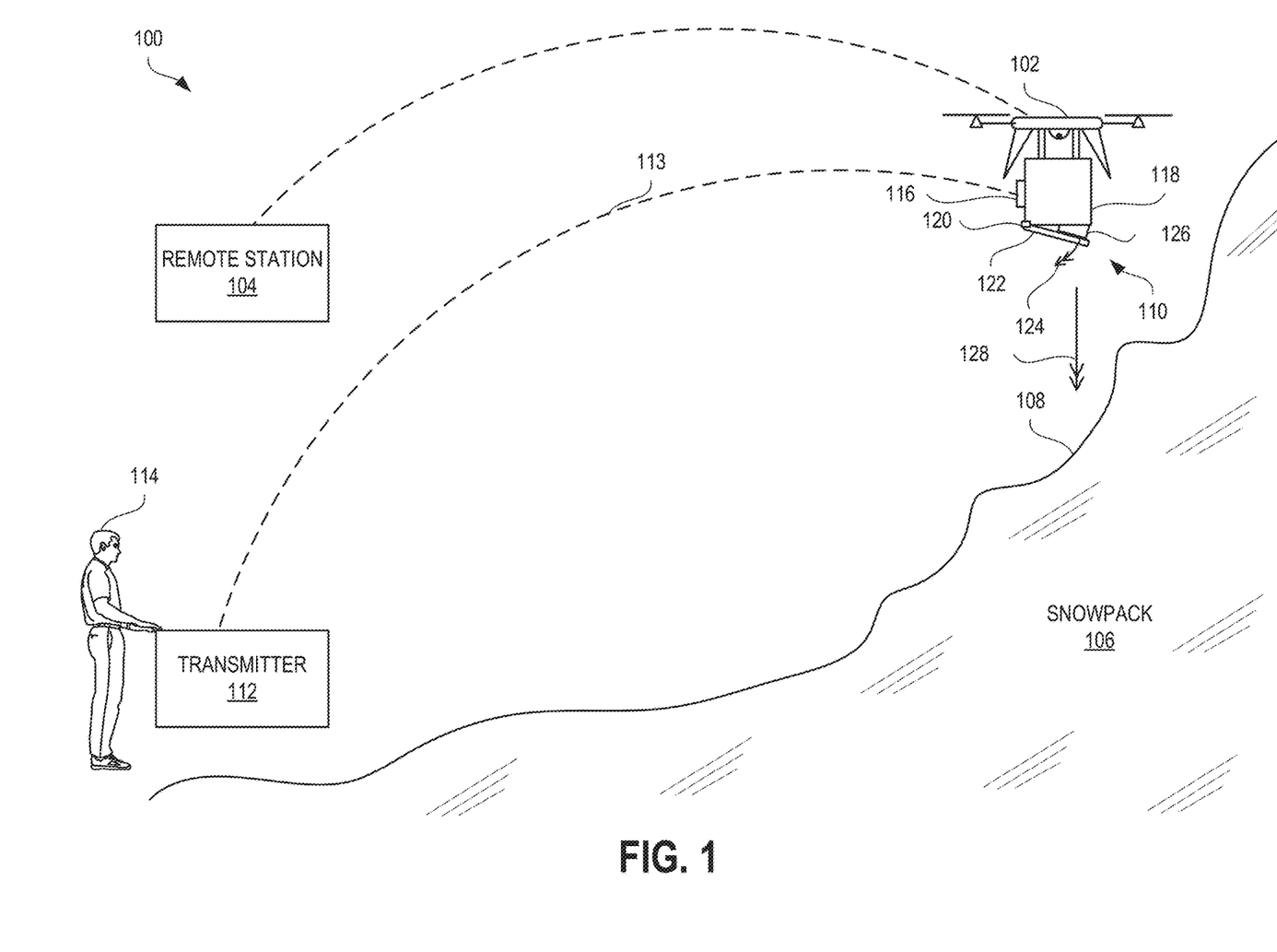
FIG. 1 is a schematic view of a system for avalanche control, in accordance with an embodiment.

FIG. 1 is a schematic view of a system 100 for avalanche control, in accordance with an embodiment.

The system 100 may include an unmanned aerial vehicle 102. The unmanned aerial vehicle 102 may be operable via a remote station 104. In some embodiments, the unmanned aerial vehicle 102 may be preprogrammed to function autonomously without communication with a remote operator.

In some embodiments, the unmanned aerial vehicle 102 and/or the remote station 104 may utilize GNSS (Global Navigation Satellite System) data such as GPS (Global Positioning System) data for guidance, navigation, and control.

Several unmanned aerial vehicles (or drones) may be available to operate this system. In some embodiments, an unmanned aerial vehicle 102 may be configured to operate with a minimum of 16 kg working payload, a 3 km line-of-site communication distance, and a quick connection to the landing gear. The drone system may be configured for GNSS/GPS target location. In some embodiments, an unmanned aerial vehicle 102 may have a down-facing video camera and a spotlight to see a target in dim light conditions. In various embodiments, extra drone batteries may be provided to switch batteries during and when conducting multiple missions. In some cases, it is understood that for reasons of safety, the system payload may not exceed 50% of the drone payload gross vehicle weight. It is understood that operation of the drone may be subject to local regulation, e.g. which may require that the drone be operated by a drone pilot licensed in the relevant jurisdiction. The drone may carry two large batteries fitted with quick connect rubber tie downs. A high-speed twin battery AC charger may also be provided with the drone.

The unmanned aerial vehicle 102 may be used to transport an explosive charge to be used for triggering a (controlled) avalanche of a snowpack 106, e.g. comprising snow and/or ice, by detonating the explosive charge. In various embodiments, detonation may be achieved by contact with the snowpack 106 and/or by detonation above a snow surface 108 of the snowpack 108. For example, an avalanche may be triggered by a detonation occurring a distance above the snow surface 108. In some embodiments, a distance above the snow surface 108 may be determined based on a distance from the unmanned aerial vehicle 102.

Avalanche control may be facilitated by a device 110 for avalanche control mounted on to the unmanned aerial vehicle 102. The device 110 may be operable or actuatable by a transmitter 112. The device 110 may be so operated or actuated by transmission of a signal 113, such as a release signal. In some embodiments, a user 114 may operate and/or actuate the device 110 via the transmitter 112. In various embodiments, the transmitter 112 may transmit radio signals to a receiver 116 of the device 110. For example, remote operation and/or actuation may be achieved, which may improve safety and allow avalanche control via difficult-to-access areas. In some cases, the scope of avalanche control activities may be increased via remote operation.

The device 110 may include a holder defining a body 118 connected to hinge(s) 120. The hinge(s) 120 may be coupled to door(s) 122 of the holder to allow pivoting of the door(s) relative to the body 118 in a direction 124 defined by a horizontal axis of rotation. The body 118 may be configured to hold an explosive charge 126 to be released above the snow surface 108 in a generally vertical direction 128.

Figure 2A:
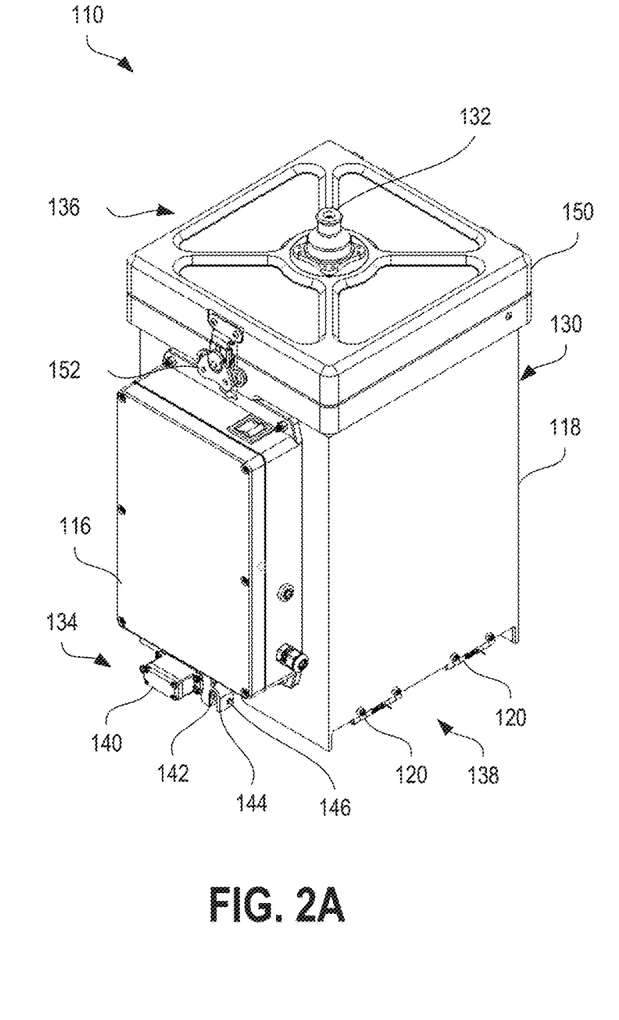
FIG. 2A is a perspective view of the device for avalanche control, in accordance with an embodiment.

FIG. 2A is a perspective view of the device 110 for avalanche control, in accordance with an embodiment.

Figure 2B:
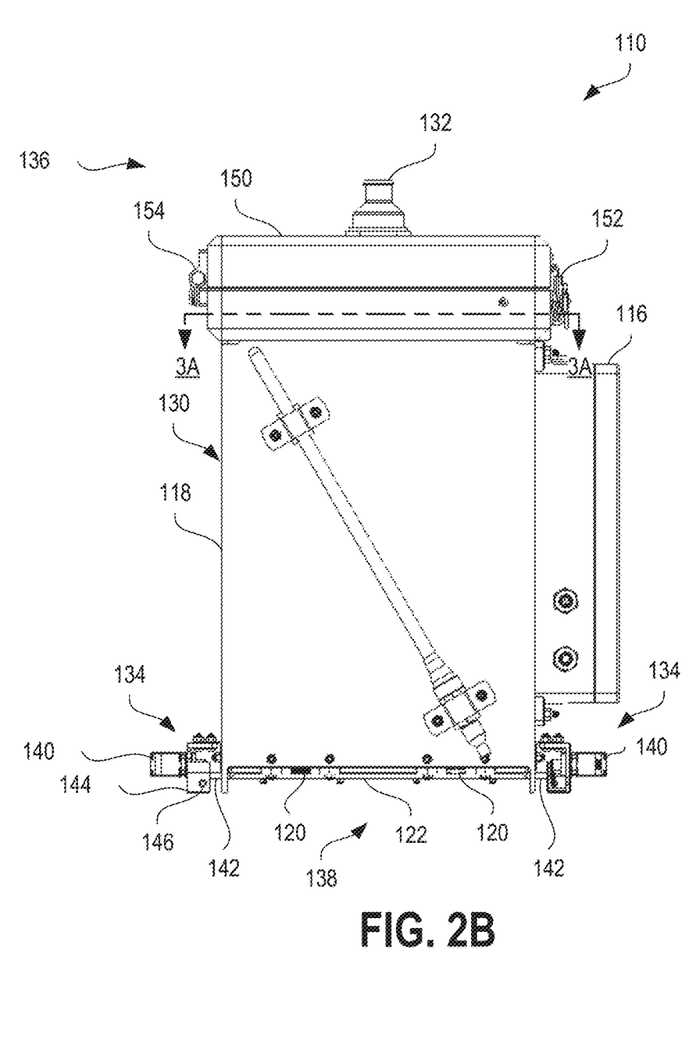
FIG. 2B is a side elevation view of the device of FIG. 2A, in accordance with an embodiment.

FIG. 2B is a side elevation view of the device 110 of FIG. 2A, in accordance with an embodiment.

Figure 2C:
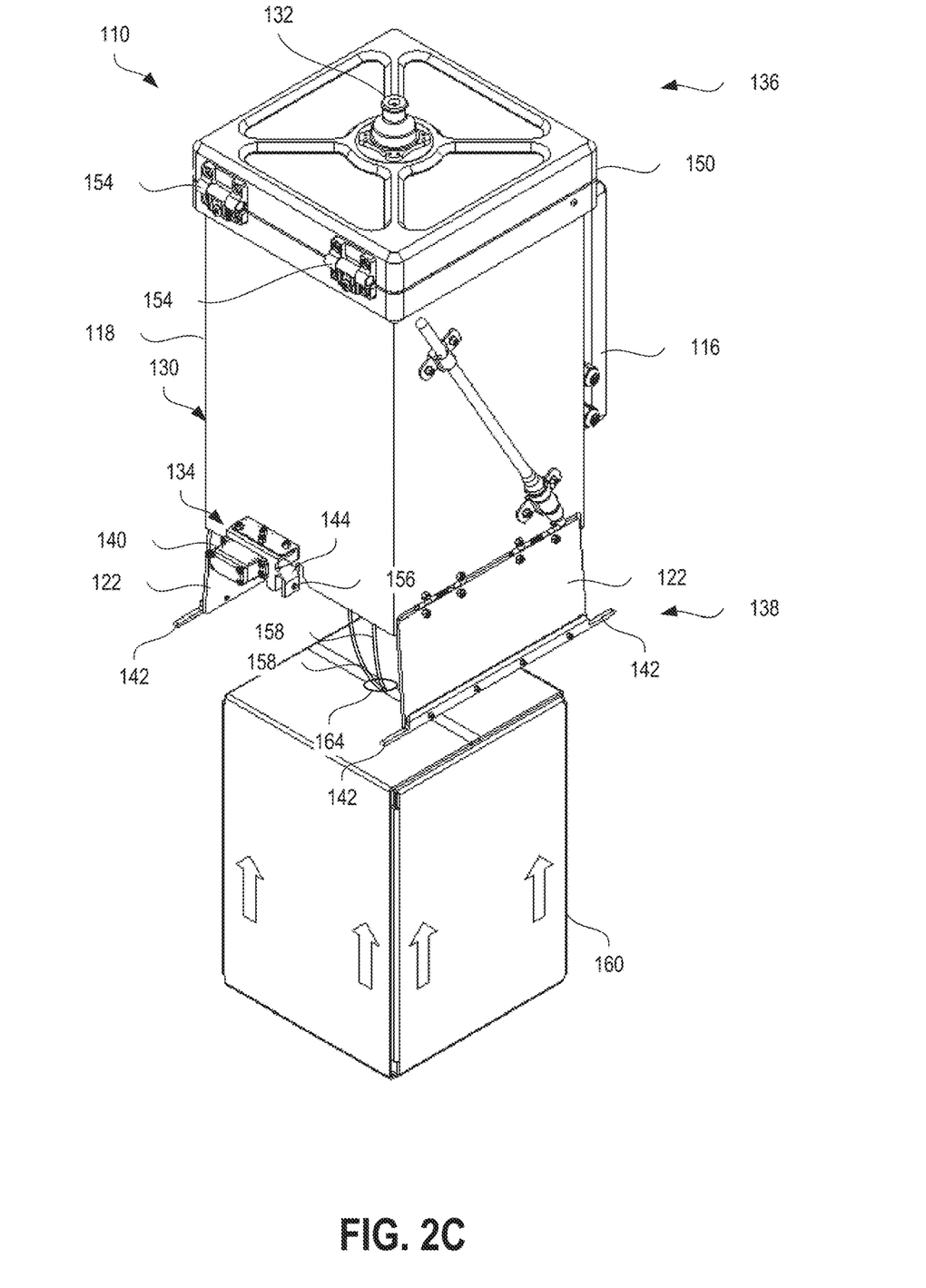
FIG. 2C is a perspective view of the device of FIG. 2A with doors open, in accordance with an embodiment.

FIG. 2C is a perspective view of the device 110 of FIG. 2A with doors 122 open, in accordance with an embodiment.

A holder 130 of the device 110 may be configured to hold the explosive charge 126.

A coupler 132 of the device 110 may be coupled to the holder 130. The coupler 132 may be configured to attach the holder 130 to the unmanned aerial vehicle 102 to transport the explosive charge 126 to above the snow surface 108 using the unmanned aerial vehicle 102. In various embodiments, the coupler 132 may be a quick connect or quick release connector to allow rapid attachment to the unmanned aerial vehicle 102.

The holder 130 may be coupled to the receiver 116. The receiver 116 may be configured to receive a release signal, e.g. from the transmitter 112. In some embodiments, the release signal may be a radio signal and the receiver 116 may be configured to receive the release signal from a transmitter 112 that is remote from the receiver 116 to cause release of the explosive charge 126.

In various embodiments, the holder 130 may be configured to release the explosive charge 126 in response to the receiver 116 receiving the release signal. The explosive charge 126 may be fuzed to detonate after release from the holder 130 to trigger an avalanche. In some embodiments, the explosive charge 126 may be detonated by a pull-operated fuze.

As referred to herein, "fuze" may generally refer to a device in an explosive device that makes it explode upon triggering of the fuze, upon impact, after an interval, at set distance from a location, or when subjected to magnetic or vibratory stimulation. In some cases, a fuze may include a length of material along which a small flame travels.

The receiver 116 may be operably coupled to the holder 130 via an actuator 134 of the holder 130 to operate the actuator 134 in response to receiving the release signal. In some embodiments, a relay may operably connect the actuator 134 to the receiver 116. The actuator 134 may refer to one or more actuators.

In various embodiments, the actuator 134 may be configured to actuate to open the doors 122 of the holder 130 to release the explosive charge 126. In various embodiments, the doors 122 may be configured to open by pivoting relative to the body 118 of the holder 130. In some embodiments, the doors 122 may be pivotably coupled to the body 118 via hinges 120. Having two or more doors 122 may be advantageous, as it may provide increased safety via redundancy and may reduce operational requirements on each separate door 122, thereby improving reliability and robustness.

The hinges 120 may be configured to be resilient (or resilient hinges) to keep the doors 122 in an open position unless placed in a closed position and prevented or obstructed from opening. The hinges 120 may be configured to apply a restoring torque to the doors 122 to open the doors 122 in response to the actuation of the actuator 134 to open the doors 122.

In some embodiments, the doors 122 of the device 110 (and holder 130) may be disposed at a bottom end 138 of the device 110. In various embodiments, the coupler 132 may be disposed at a top end 136 of the device 110 opposed the bottom end 138.

In some embodiments, the doors 122 may be configured to support the explosive charge 126 when the doors 122 are closed. For example, doors 122 may be disposed, situated, and/or positioned underneath the explosive charge 126 when the door 122 is closed.

In various embodiments, doors 122 may be configured to cause the explosive charge 126 to fall out of the holder 130 by stopping supporting the explosive charge 126 when the doors 122 are opened.

In some embodiments, the actuator 134 may include a motor 140. In various embodiments, the actuator 134 may include a member 146 configured to obstruct pivoting of the doors 122 to prevent opening of the doors 122 when the are doors 122 closed. In some embodiments, the actuator 134 may be configured to cause the member 146 to stop obstruction of the pivoting of the doors 122 when the actuator 134 is actuated to open the doors 122. The motor 140 may be coupled to the member 146 to operably drive the member 146.

In various embodiments, the member 146 may be retained in a sliding collar 144 or may be retainably slidable in the sliding collar 144. The sliding collar 144 may include one or more apertures 156 for receiving the member 146. One or more projections 142 of the doors 122 may also be contained in the sliding collar 144, as will be explained later.

A top end 138 of the device 110 may include a lid 150 that be pivotably coupled to the body 118 via one or more lid hinges 154 to provide easy access to innards of the body 118. The lid 150 may further be secured to the body 118 via a releasable fastener 152.

A container 160 of the explosive charge 126 may be configured to be contained in the body 118. In some embodiments, container 160 dimensions may be adapted to those of the body 118.

One or more lines 158 (e.g. wires or cables) may extend from the container 160 to the holder 130 via an opening 164 of the container 160.

Figure 3A:
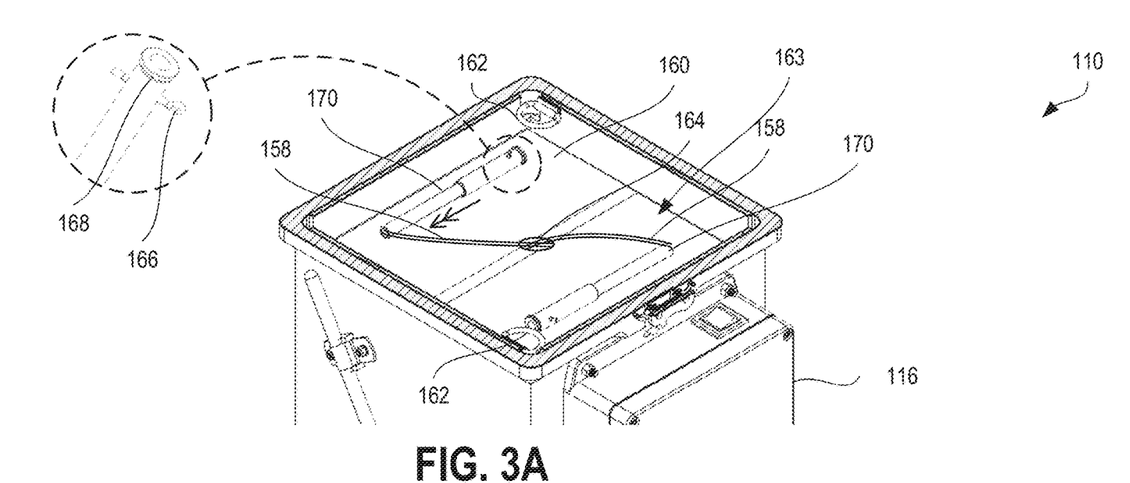
FIG. 3A is a partial perspective sectional view of the device along the line 3A-3A in FIG. 2B, in accordance with an embodiment.

FIG. 3A is a partial perspective sectional view of the device 110 along the line 3A-3A in FIG. 2B, in accordance with an embodiment.

A holding volume 163 of the holder 130 may be at least partially defined by the doors 122.

The holder 130 may include one or more retaining hooks 162 fixed an inside surface of the body 118.

The lines 158 may be operably coupled to corresponding fuzes 170 to enable causing an explosion of the explosive charge 126 when the lines 158 are pulled relative to the fuzes 170.

The fuzes 170 in FIG. 3A are shown in a disconnected state. As shown, the fuzes 170 may be lying freely on the container 160 and may not allow pulling of the lines 158 relative to the fuzes 170.

In the connected state of the fuzes 170, retaining heads 168 and/or retaining clips 166 of the fuzes 170 may passed through and engaged with the retaining hooks 162 to hold an upper part of the fuzes 170 fixed relative to the body 118 such that a lower part of the fuzes 170 comes apart when pulled by the lines 158 to cause ignition or detonation, e.g. via a small flame traveling along the lines 158. The lines 158 may thereby be configured to trigger detonation by being pulled relative to the fuzes 170 by falling of the explosive charge 126 after release by the holder 130.

Figure 3B:
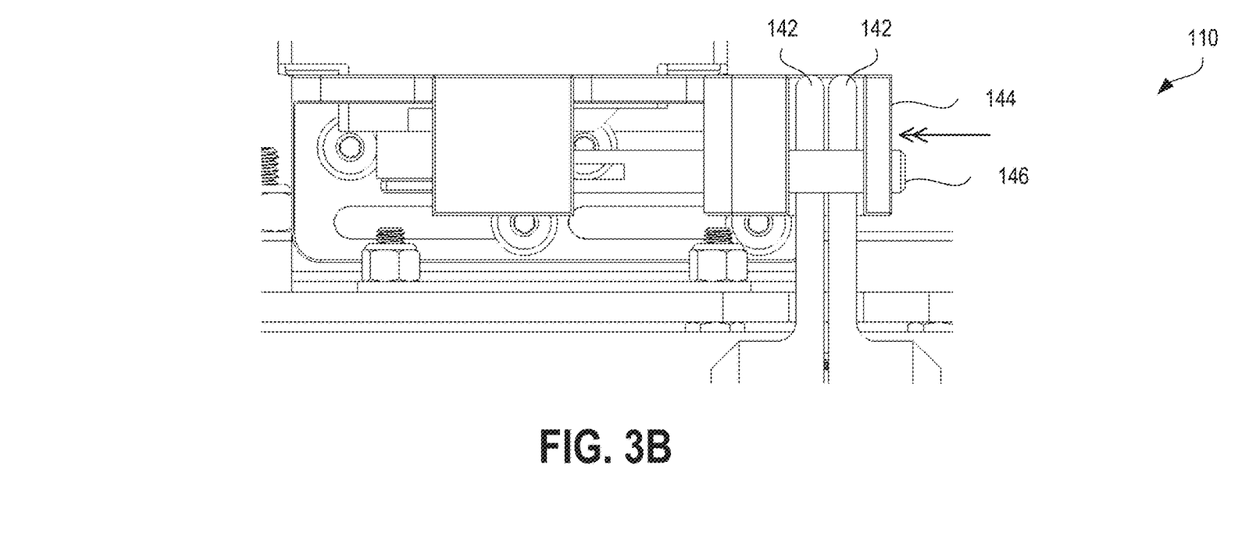
FIG. 3B is an enlarged bottom plan view of the device showing an actuator engaged with the doors, in accordance with an embodiment.

FIG. 3B is an enlarged bottom plan view of the device 110 showing the actuator 134 engaged with the doors 122, in accordance with an embodiment.

When engaged with the sliding collar 144, the member 146 blocks the projections 142 of the doors from passing through the sliding collar 144, to thereby prevent pivotable opening of the doors 122. For example, such projections 142 may be provided at a relatively central (or off-edge) location and be associated with adjacent doors 122.

Figure 4:
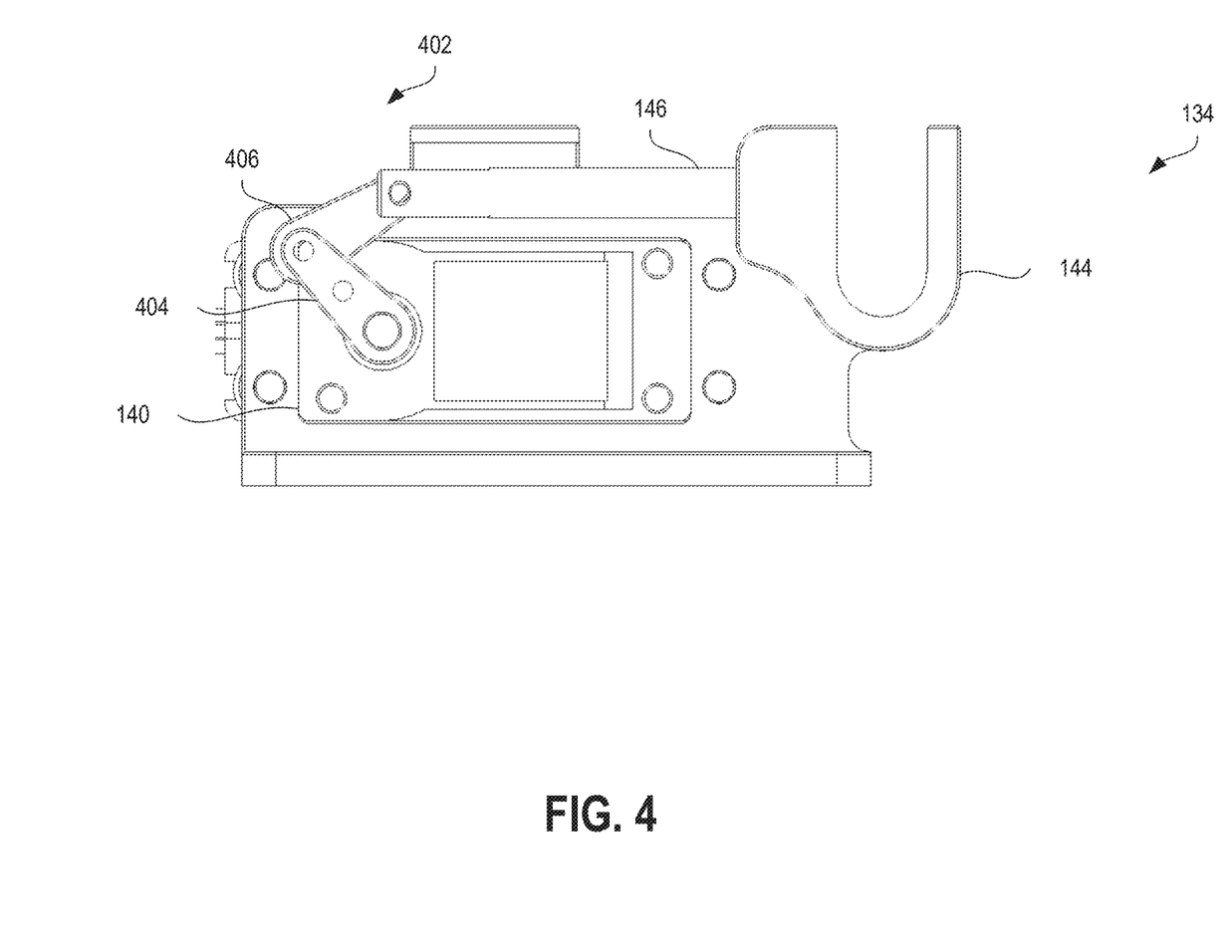
FIG. 4 is an elevation view of the actuator with a member of the device withdrawn and the doors disengaged, in accordance with an embodiment.

FIG. 4 is an elevation view of the actuator 134 with the member 146 withdrawn and the doors 122 disengaged, in accordance with an embodiment.

In some embodiments, the actuator 134 may include a slider-crank mechanism 402. The member 146 may be a slider of the slider-crank mechanism 402. A crank 404 of the slider-crank mechanism may be rotatably coupled to a motor 140 of the actuator 134 operatively coupled to the receiver 116.

In some embodiments, the slider-crank mechanism 402 may advantageously comprise at least three links, wherein an intermediate link 406 is freely rotatably coupled at opposite ends to the member 146 and the crank 404, respectively. The slider-crank mechanism 402 may be configured to provide leverage to prevent jamming of the doors when weight of the explosive charge 126 is placed thereon.

Figure 5:
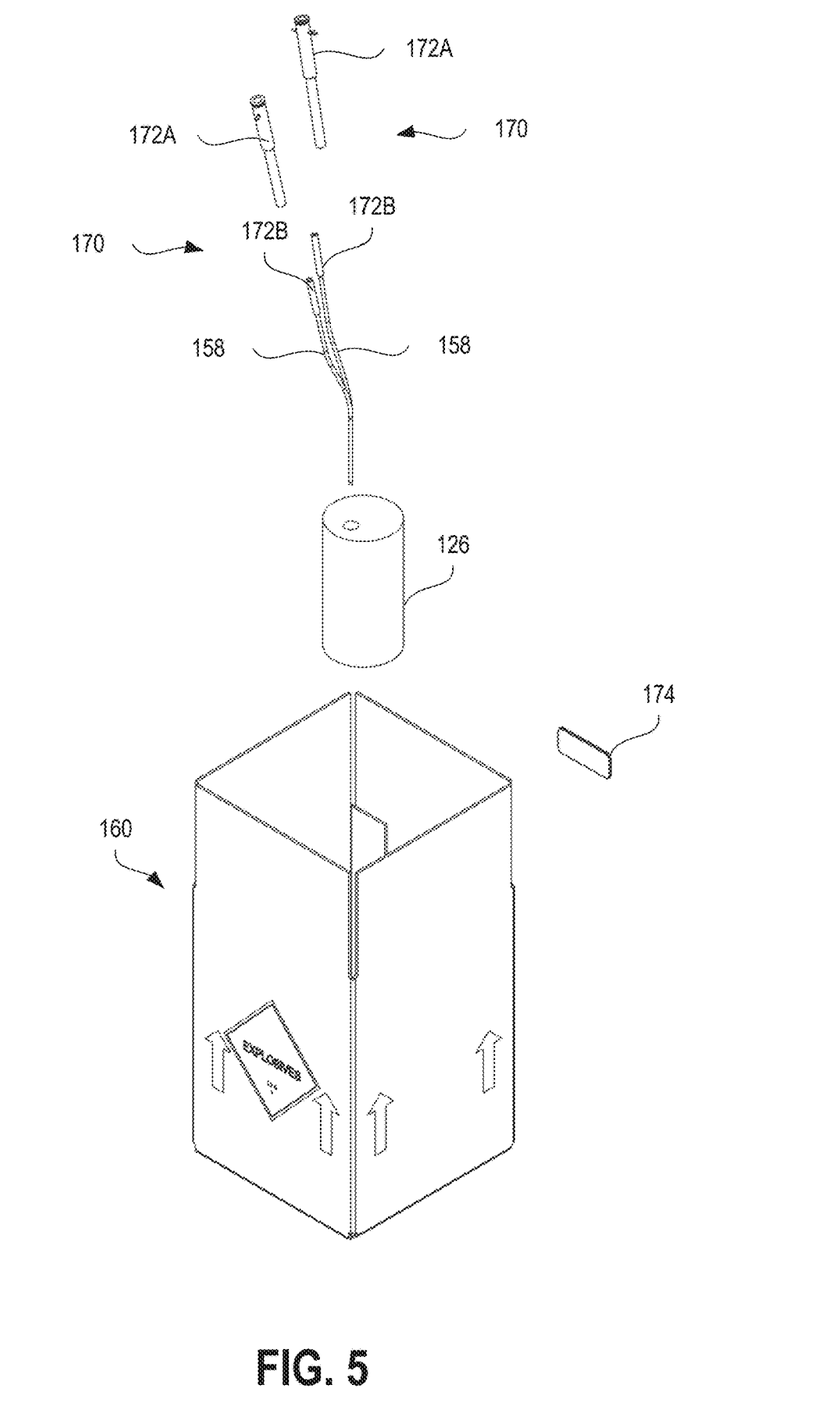
FIG. 5 is an exploded perspective view of a container, in accordance with an embodiment.

FIG. 5 is an exploded perspective view of a container 160, in accordance with an embodiment.

In various embodiments, the explosive charge 126 may contain a booster and an explosive in the container 160. In various embodiments, the container 160 may be collapsible, e.g. a cardboard container, and/or flammable, which may provide advantages for manufacturing and deployment.

The container 160 may be configured to be disposed in the holding volume 163 and may contain an explosive charge 126.

A first portion 172A of the fuzes 170 may remain attached to the unmanned aerial vehicle 102. As the explosive charge 126 falls away from the unmanned aerial vehicle 102, a second portion 172B of the fuze 170 may pull away therefrom to cause ignition or lighting of the line 158. This may result in detonation of the explosive charge 126 at a predetermined distance away from the unmanned aerial vehicle 102.

The predetermined distance may be based on the length(s) of the lines 158. In various embodiments, the predetermined distance may be a minimum distance away from the unmanned aerial vehicle 102, the snow surface 108, and/or a maximum distance away from the snow surface 108. In some embodiments, the predetermined distance may be based on a velocity or speed of the explosive charge 126 falling from the unmanned aerial vehicle 102.

In some embodiments, the container 160 may have mounted thereon a passive transponder 174 attached to the container 160. The passive transponder 174 may be configured to, when hit by a first radio signal, transmit a second radio signal to help locate the container 160, thereby improving safety.

Figure 6A:
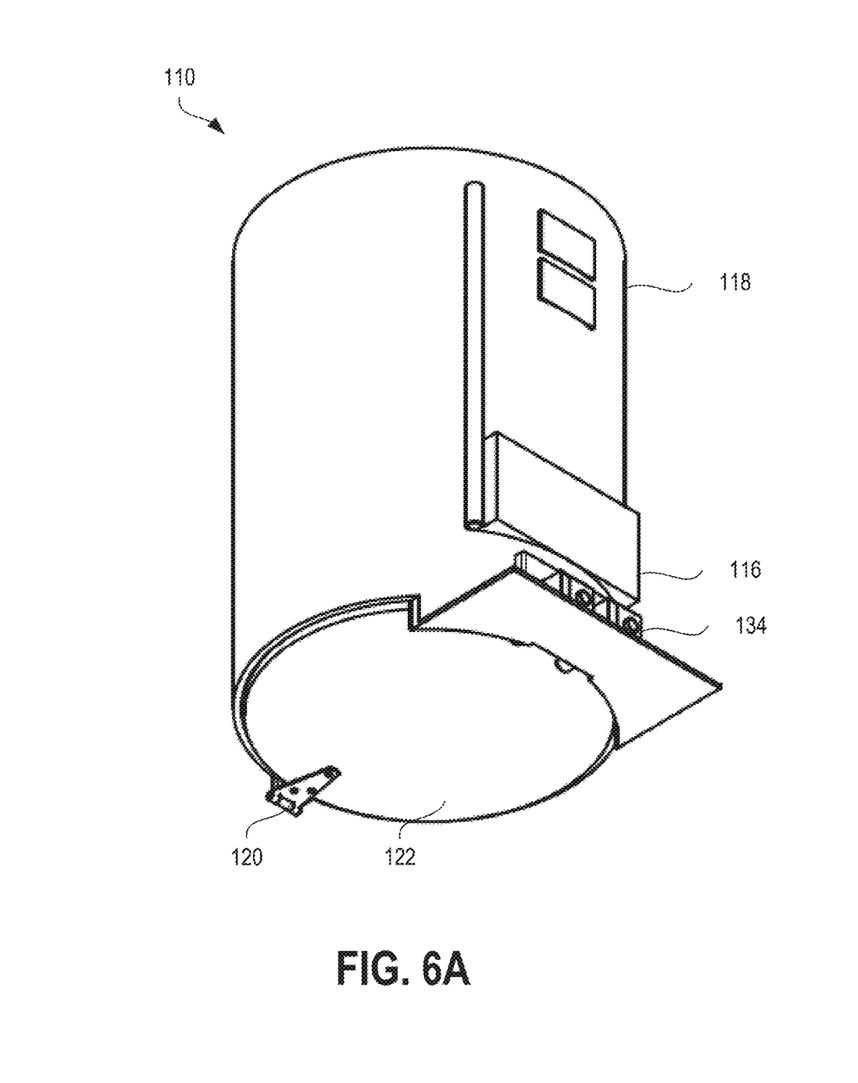
FIG. 6A is a perspective view of the device, in accordance with another embodiment.

FIG. 6A is a perspective view of the device 110, in accordance with another embodiment.

Figure 6B:
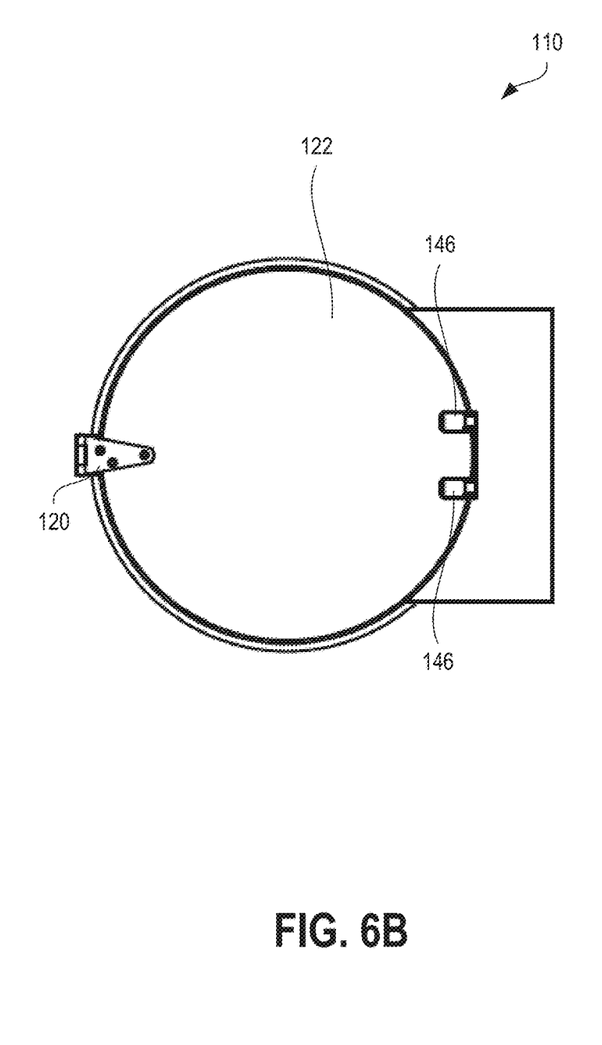
FIG. 6B is a bottom plan view of the device of FIG. 6A.

FIG. 6B is a bottom plan view of the device 110 of FIG. 6A.

The embodiments shown in FIGS. 6A-6B may be similar, in some respects, to the embodiments shown in FIGS. 2A-2C, as may be understood from the drawings. The embodiments shown in FIGS. 6A-6B may be cylindrical, may comprise a single hinge 120, a single door 122, and may actuatably open the door 122 by operating at least one (or at least two) members 146 that are in contact with the door 122 from underneath the door 122 to hinder gravitationally-caused pivoting of the door 122. Reference to a single hinge 120 and a single door 122 may refer to actuatable release of the explosive charge 126 by actuation only a single hinge 120 and a single door 122.

Figure 7A:
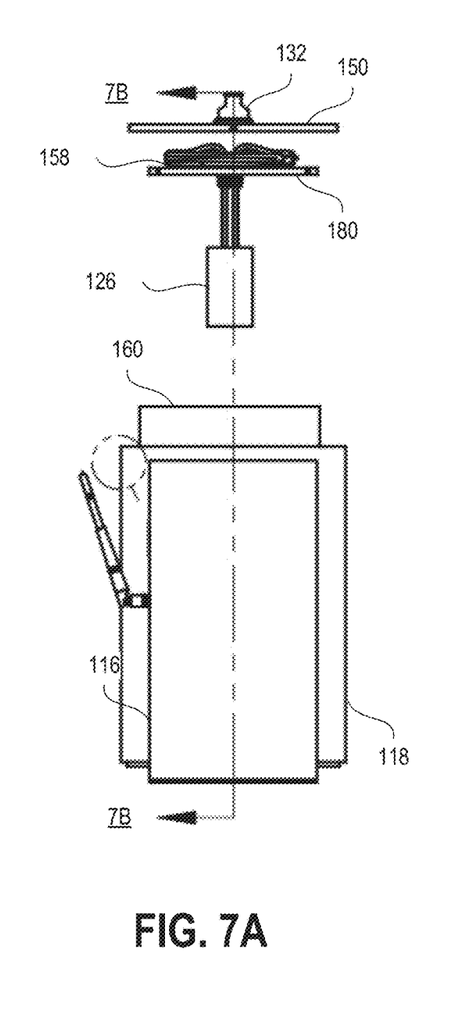
FIG. 7A is an exploded side elevation view of the device of FIG. 6A, in accordance with an embodiment.

FIG. 7A is an exploded side elevation view of the device 110 of FIG. 6A, in accordance with an embodiment.

Figure 7B:
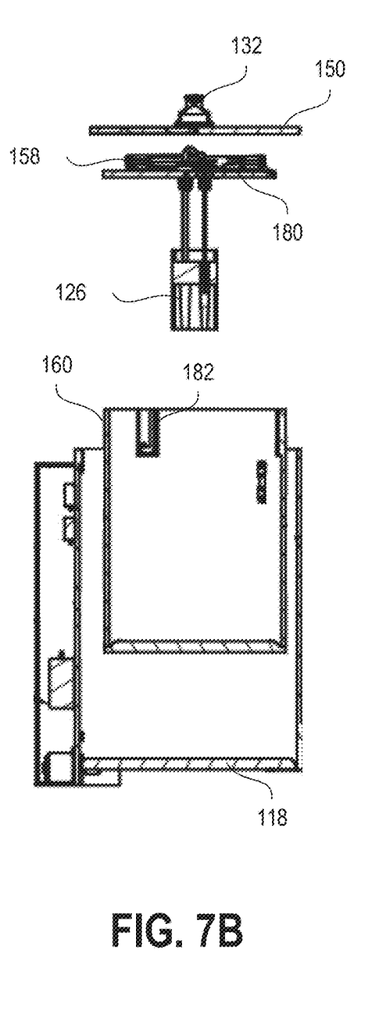
FIG. 7B is a cross-sectional view along the line 7B-7B in FIG. 7A, in accordance with an embodiment.

FIG. 7B is a cross-sectional view along the line 7B-7B in FIG. 7A, in accordance with an embodiment.

Figure 7C:
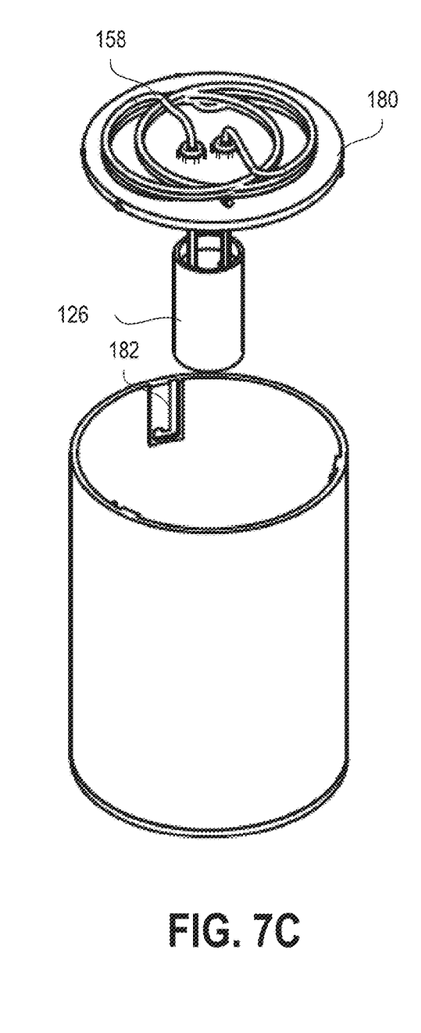
FIG. 7C is an exploded perspective view of a portion of the device of FIG. 6A, in accordance with an embodiment.

FIG. 7C is an exploded perspective view of a portion of the device 110 of FIG. 6A, in accordance with an embodiment.

An upper portion of the lines 158 may be retained fixed relative to the body 118 using a retaining plate 180 threadably receiving the lines 158. The retaining plate 180 may retained in the body when the door 122 is opened by pivotable stops 182 (or hooks) that may retract into an inner volume of the body 118 (holding volume 163, e.g.) and lock in-place (in some embodiments) to prevent falling of the retaining plate 180.

Figure 8A:
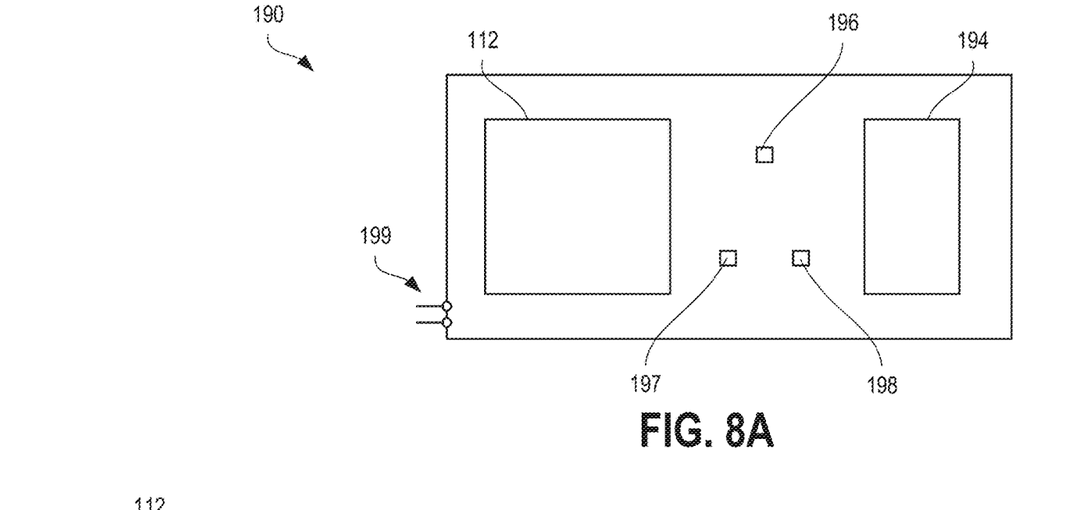
FIG. 8A is a schematic view of an operating unit for operating a device, in accordance with an embodiment.

FIG. 8A is a schematic view of an operating unit 190 for operating the device 110, in accordance with an embodiment. The operating unit 190 may be operated by a user 114.

The operating unit 190 may also be referred to as a "pelican case".

The operating unit 190 may include a battery 194, the transmitter 112, an antenna assembly 199, a button 196 for powering the operating unit 190, a button 197 for arming the device 110, and a button 198 for firing the device 110. Firing may refer to release of the explosive charge 126 to cause detonation above the snow surface 108.

Figure 8B:
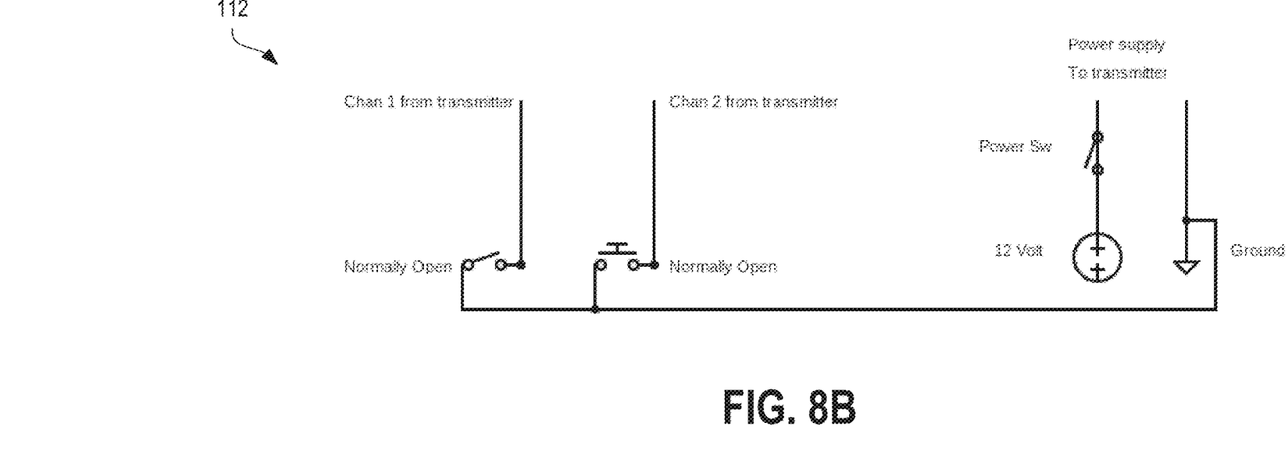
FIG. 8B is an electrical circuit diagram of the transmitter, in accordance with an embodiment.

FIG. 8B is an electrical circuit diagram of the transmitter 112, in accordance with an embodiment.

The transmitter 112 may be configured to transmit separate signals via two distinct channels for actuating two separate actuators 134 or two separate parts of the actuator 134. In some cases, the signals may be sent sequentially, and/or in parallel. The additional redundancy may improve safety and robustness of the system 100.

Figure 9:
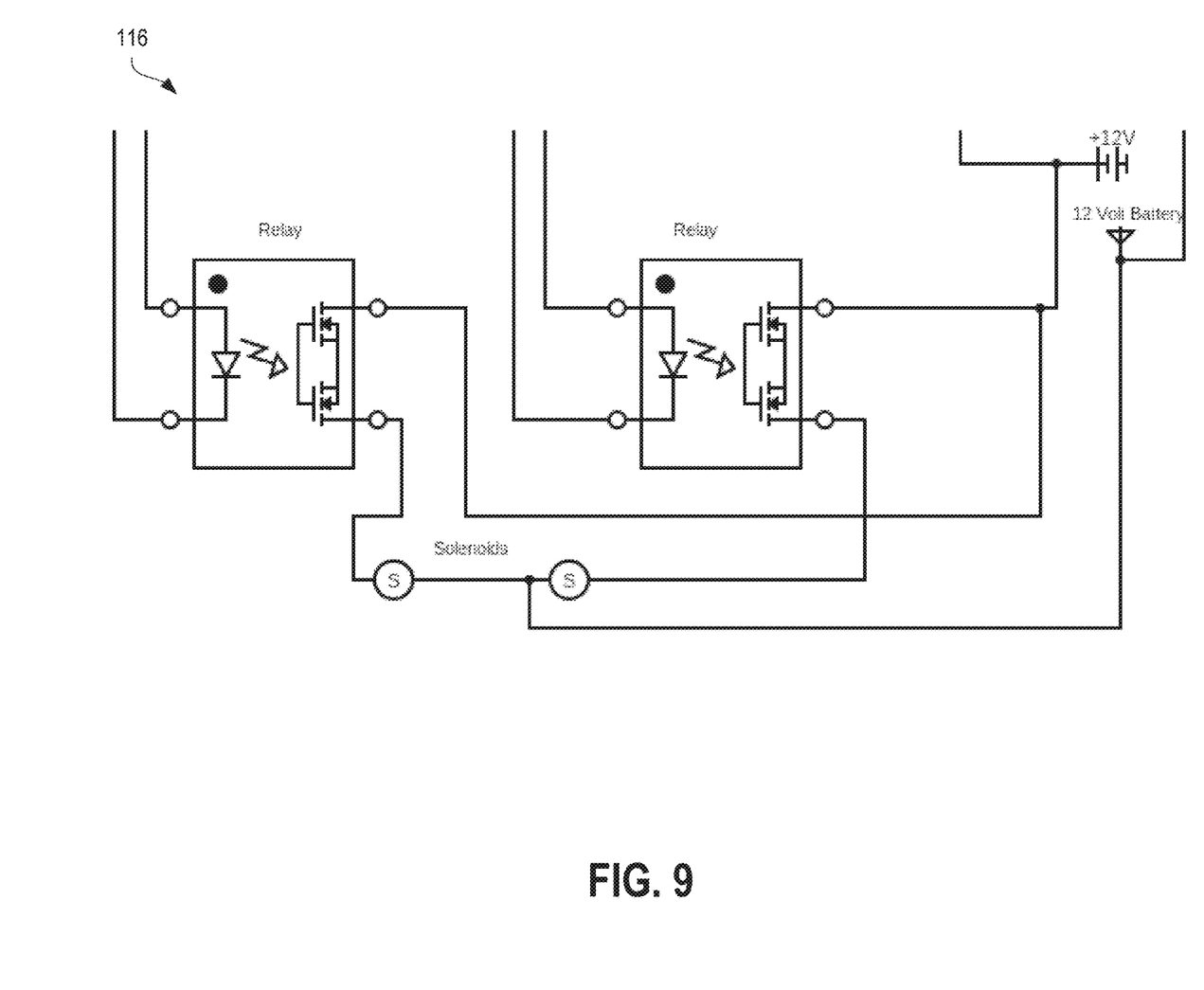
FIG. 9 is an electrical circuit diagram of a receiver, in accordance with an embodiment.

FIG. 9 is an electrical circuit diagram of a receiver 116, in accordance with an embodiment.

The receiver 116 may be configured to receive separate signals via separate and distinct channels to actuate separate and distinct relays operably connecting the actuators 134 to the receiver. These separate and distinct relays may then actuate separate actuators. In some embodiments, the actuation may be carried out via solenoids.

In various embodiments, a transmitter 112 may be remote from the unmanned aerial vehicle 102 and may be configured to transmit a release signal to be received by a receiver 116. The doors 122 may be configured to be actuatable from a closed position to an open position in response to receiving of the release signal by the receiver 116.

Figure 10:
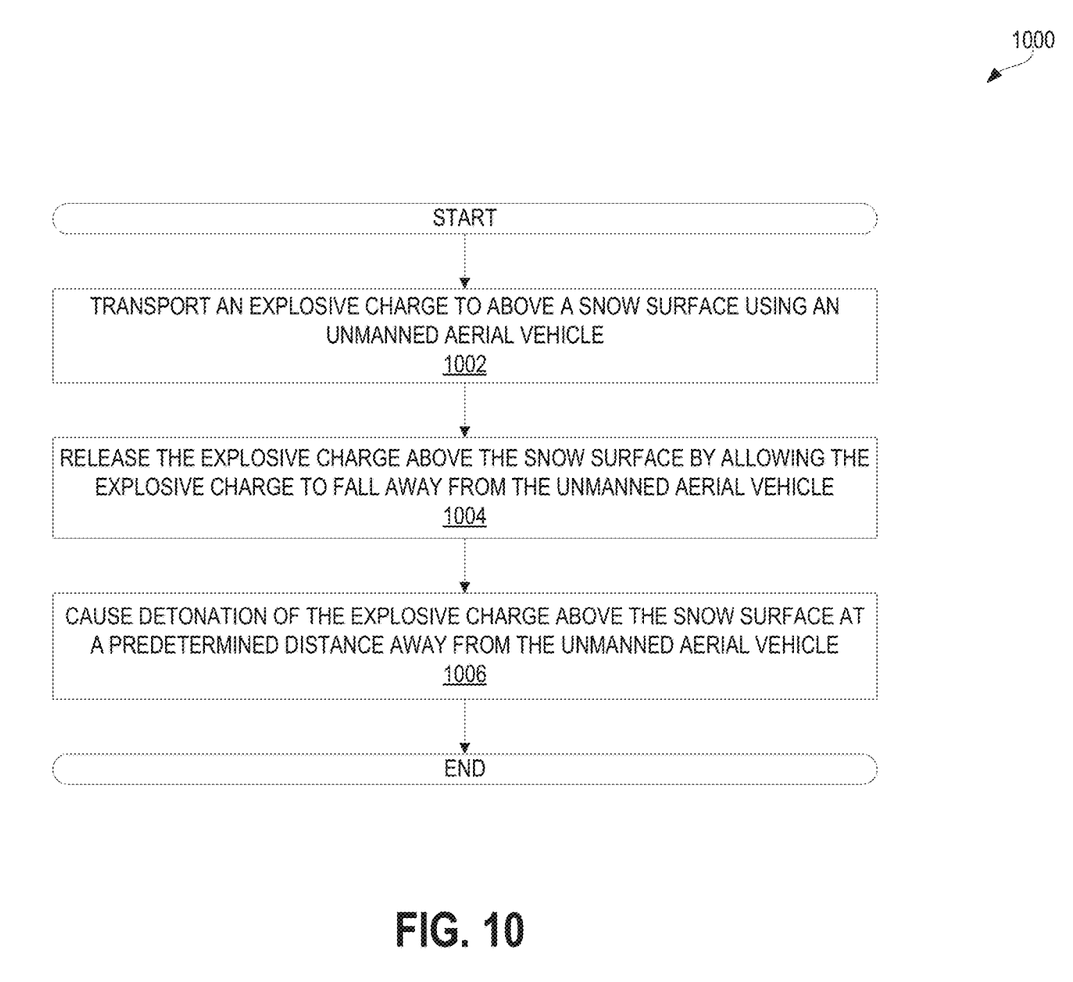
FIG. 10 is a flow chart of a method of avalanche control, in accordance with an embodiment.

FIG. 10 is a flow chart of a method 1000 of avalanche control, in accordance with an embodiment.

Step 1002 of the method 1000 may include transporting an explosive charge to above a snow surface using an unmanned aerial vehicle.

Step 1004 of the method 1000 may include releasing the explosive charge above the snow surface by allowing the explosive charge to fall away from the unmanned aerial vehicle.

Step 1006 of the method 1000 may include causing detonation of the explosive charge above the snow surface at a predetermined distance away from the unmanned aerial vehicle.

In some embodiments, the method 1000 may further include receiving a release signal. In some embodiments of the method 1000, the step 1004 may include releasing the explosive charge in response to receiving the release signal.

In some embodiments of the method 1000, the step 1002 may include holding the explosive charge in a container supported on a door that is closed.

In some embodiments of the method 1000, the step 1004 may include causing the door to open to withdraw support from the container to cause the container to fall.

In some embodiments of the method 1000, the step 1006 may include triggering a fuze of the explosive charge by causing a line connected to the unmanned aerial vehicle and operably coupled to the fuze to be pulled away from the fuze by the falling of the explosive charge away from the unmanned aerial vehicle.

In various embodiments, the system 100 and/or device 110 may be provided partially or fully in kit form and/or with instructions for operations.

An exemplary instruction set or guidelines for loading procedures is provided below in numbered form. The system 100 and/or device 110 may be referred to as S6 or the S6 system (S6 abbreviating Sentry 6).

1 Preparing the S6 for Loading—Prior to loading the barrel with explosives:
   1.1 Confirm the radio connections to the 2 actuators are working
   1.2 Confirm that the drone flying communications to the laptop are working
   1.3 Confirm the two video cameras on the drone are working
   1.4 Confirm all items needed for S6 payload assembly are present 2 On arrival at the launching device, proceed as follows:
2.1 Take one Sentry 6 payload box from the bundle of 15 boxes.
2.2 Close the bottom flaps of the box and generously tape them shut with a packing tape gun.
2.3 Take one 2 mil plastic liner that is included with the box, open it up inside the Sentry 6 box and fold the excess plastic liner over the open 4 top flaps of the box.
2.4 Take one, Twinplex™, 0.5 kg, TNT booster.
2.5 Cut 2 units, 1-meter fuse assemblies down to 450 mm length each. Make sure the cut is square and clean.
2.6 Insert the two fuse assemblies through the larger thru channel on the bottom of the booster, and into the 2 detonator wells at top end of the booster.
2.7 Insert the Twinplex™ TNT booster into the centre of the Sentry 6 kg payload container.
2.8 Fill the Sentry 6 kg payload container with ANFO around the Twinplex™ booster right up to the desired charge weight.
2.9 Gather up the plastic liner from over the top box flaps and squeeze the bag down on top of the ANFO with the 2 fuse assemblies running through the center of the gathered up bag.
2.10 Tightly tie the wire tie strap, which is provided with the Sentry 6 box, down overtop of the ANFO and around the gathered up plastic liner.
2.11 Take a pull wire igniter, attach it to the end of the fuse by pushing it all the way on to the fuse until it bottoms out. Repeat this for the second fuse.
2.12 Tape the two fuse assemblies together with electric tape.
2.13 At this time the box top flaps can be moved into their closed position. One flap at a time, while pulling the plastic bag with the two fuse assemblies running thru the center, into the perforated "X" in all 4 top flaps.
2.14 Once all the flaps are in place, generously tape and seal the top of the box closed with a packing tape gun.
2.15 Remove the lid from the barrel and place the barrel on its side.
2.16 Open the trap door floor and swing the door on its hinges until it is wide open.
2.17 Slide the Sentry 6 payload box into the muzzle of the barrel, with the fuse strands protruding from the center of the top of the box.
2.18 Close and lock in the trap door floor after the payload has been loaded by pushing the door closed until the actuators click in place.
2.19 Turn the barrel from a sideways position to straight upright position.
2.20 Hang the strings from the two pull wire lighters into the carabiner hooks on the upper inside(s) of the barrel. Ensure that the fuse strands are laying as flat as possible with the top end of the pull wire lighter facing the carabiner hook.
2.21 Apply the lid of the barrel and lock it in place using the lid latches.
2.22 Connect the barrel to the drone inside the landing gear using the quick connections.

An exemplary instruction set or guidelines for delivering an explosive payload is provided below in numbered form.
1 Payload delivery procedure is as follows:
1.1 Connect the transmitting aerial to the Pelican firing case using the bayonet connection on the outside of the case.
1.2 Place the aerial on a metal surface (like a vehicle roof) using the magnet provided on the aerial.
1.3 Extend drone propeller arms and lock in place using the propeller arm locking clips.
1.4 Program the drone command laptop to fly the system to a predetermined target GPS location. Refer to item 2 of this section.
1.5 Once the drone is in position at least 15 meters above the target. Check the status of the target by looking at the down facing camera feed on the laptop. A small drone with an articulating camera is fixed to the outside of the landing gear. This gives the opportunity to see the target prior to releasing the payload, and, to watch the payload land on the target, for a sew seconds, to visually confirm that the safety fuse(s) are lit before exiting the area. This system is using the DJI mini drone for this purpose.
1.6 Once the drone and video camera are in position, the blaster of record, by means of the firing pelican case, commands the first actuator to with-draw its pin underneath the trap door. At this time the blaster loudly declares "Safety Off". The pilot should repeat this command loudly . . . " Safety Off'.
1.7 The blaster of record, by means of the firing pelican case, commands the second pin to with-draw from under the trap door, allowing the trap door to swing down and open. While performing this last function, the blaster of record declares "Ready to Fire" . . . "Fire".
1.8 The charge may be visible on the laptop screen falling onto the snow below. It may be possible to visually see the smoke emanating from the 2 fuse assemblies on the down facing camera. The drone will have about 10 seconds to confirm this and then must immediately evacuate the area and return back to the base. The trap door will be swinging open as the drone flies back to base.
1.9 Prior to commencing any subsequent missions, the following must be checked for operational safety: battery levels and whether a replacement battery needs to be installed; trap door must be re-secured with the actuator pins. Ensure the actuators, are both working properly; radio communication checked; barrel lid removed; clean inside of the barrel by removing the PWL pull wire.

As can be understood, the examples described above and illustrated are intended to be exemplary only.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

What is claimed is:

1. A device for avalanche control, comprising:
   a receiver configured to receive a release signal;
   a holder configured to hold an explosive charge and coupled to the receiver to release the explosive charge in response to the receiver receiving the release signal; and
   a coupler coupled to the holder and configured to attach the holder to an unmanned aerial vehicle to transport the explosive charge to above a snow surface using the unmanned aerial vehicle,
   a non-electric fuze assembly coupled to the explosive charge, the fuze assembly comprising a pyrotechnic pull wire ignitor coupled to a fuze, the pyrotechnic pull wire ignitor being connected by a line to the holder, the pull wire ignitor ignites the fuze as the explosive charge falls away from the holder, the ignited fuze being operable for the delayed detonation of the explosive charge to trigger an avalanche.

2. The device of claim 1, wherein the release signal is a radio signal, and the receiver is configured to receive the release signal from a transmitter that is remote from the receiver to cause release of the explosive charge.

3. The device of claim 1, wherein the receiver is operably coupled to the holder via an actuator of the holder to operate the actuator in response to receiving the release signal.

4. The device of claim 3, wherein a relay operably connects the actuator to the receiver.

5. The device of claim 3, wherein the actuator is configured to actuate to open a door of the holder to release the explosive charge.

6. The device of claim 5, wherein the door is disposed at a bottom end of the device and the coupler is disposed at a top end of the device opposed the bottom end.

7. The device of claim 5, wherein the door is configured to support the explosive charge when the door is closed, and to cause the explosive charge to fall out of the holder by stopping supporting the explosive charge when the door is opened.

8. The device of claim 7, wherein the door is underneath the explosive charge when the door is closed.

9. The device of claim 5, wherein the door is configured to open by pivoting relative to a body of the holder and the actuator includes a member configured to obstruct pivoting of the door to prevent opening of the door when the door is closed, the actuator configured to cause the member to stop obstructing pivoting of the door when the actuator is actuated.

10. The device of claim 9, wherein the member is a slider of a slider-crank mechanism comprising at least three links, a crank of the slider-crank mechanism being rotatably coupled to a motor of the actuator operatively coupled to the receiver.

11. The device of claim 9, wherein the door is pivotably coupled to the body of the holder via a resilient hinge configured to apply a restoring torque to the door to open the door in response to the actuation of the actuator.

12. The device for avalanche control as claimed in claim 1, wherein the fuze assembly further comprises a static draining shunt.

13. A system for avalanche control of a snowpack, comprising:
    an unmanned aerial vehicle configured to navigate to the snowpack;
    a holder attached to the unmanned aerial vehicle, the holder including a door at least partially defining a holding volume, the door being actuatable to move from a closed position to an open position;
    a container disposed in the holding volume and containing an explosive charge, the container being supported by the door in the closed position and being releasable away from the unmanned aerial vehicle above the snowpack by actuation of the door to the open position when the unmanned aerial vehicle is above the snowpack; and
    a non-electric fuze assembly coupled to the explosive charge, the fuze assembly comprising a pyrotechnic pull wire ignitor coupled to a fuze, the pyrotechnic pull wire ignitor being connected by a line to the holder, the pull wire ignitor ignites the fuze as the explosive charge falls away from the holder, the ignited fuze being operable for the delayed detonation of the explosive charge
    to trigger an avalanche of the snowpack.

14. The system of claim 13, wherein the container is collapsible, the container defining an opening for allowing coupling of the line to the fuze.

15. The system of claim 13, further comprising:
    a passive transponder attached to the container, the passive transponder configured to, when hit by a first radio signal, transmit a second radio signal.

16. The system of claim 13, further comprising:
    a transmitter remote from the unmanned aerial vehicle and configured to transmit a release signal to be received by a receiver, the door configured to be actuatable from a closed position to an open position in response to receiving of the release signal by the receiver.

* * * * *